United States Patent [19]

Nishida

[11] Patent Number: 5,218,688
[45] Date of Patent: Jun. 8, 1993

[54] DATA PROCESSING SYSTEM WITH MEMORY-ACCESS PRIORITY CONTROL

[75] Inventor: Hidehiko Nishida, Inagi, Japan
[73] Assignee: Fujitsu Limited, Kawasaki, Japan
[21] Appl. No.: 794,844
[22] Filed: Nov. 21, 1991

Related U.S. Application Data

[63] Continuation of Ser. No. 346,556, May 2, 1989, abandoned.

[30] Foreign Application Priority Data

May 6, 1988 [JP] Japan .................................. 63-110225

[51] Int. Cl.$^5$ ........................ G06F 13/18; G06F 15/16
[52] U.S. Cl. ........................... 395/425; 395/725;
395/800; 364/DIG. 1; 364/243; 364/243.1;
364/242.6; 364/242.7; 364/242.91; 364/228.1;
364/229; 364/238; 364/238.4
[58] Field of Search ............... 395/425, 724, 325, 800

[56] References Cited

U.S. PATENT DOCUMENTS 4,718,006 1/1988 Nishida ........................... 364/200

FOREIGN PATENT DOCUMENTS 0147295 12/1984 European Pat. Off. .

OTHER PUBLICATIONS

S. Horiguchi et al.: "Throughput of multiprocessor systems with common memories", Transactions of the I.E.C.E. of Japan, vol. E69, No. 6, Jun. 1986, pp. 726-729, Tokyo, Japan.

Primary Examiner—Paul V. Kulik
Attorney, Agent, or Firm—Staas & Halsey

[57] ABSTRACT

In a data processing system including a plurality of multi-processor systems, each multi-processor system having at least one central processing unit and at least one main memory both connected to a memory control unit, each memory control unit is connected to each other memory control unit, the memory control unit comprises plural ports, plural registers, access selection circuits for innner and outer access, a priority control circuit, a first and a second control circuit, and wait signal reset circuit, a priority of accesses from the same central processing unit to the other multi-processor system is detected, and the registers to store the access request signals in the other multi-processor system are efficiently used by adding a priority control signal to the access request signal. Thus, the data throughput of the system and the speed of the access are improved.

5 Claims, 6 Drawing Sheets

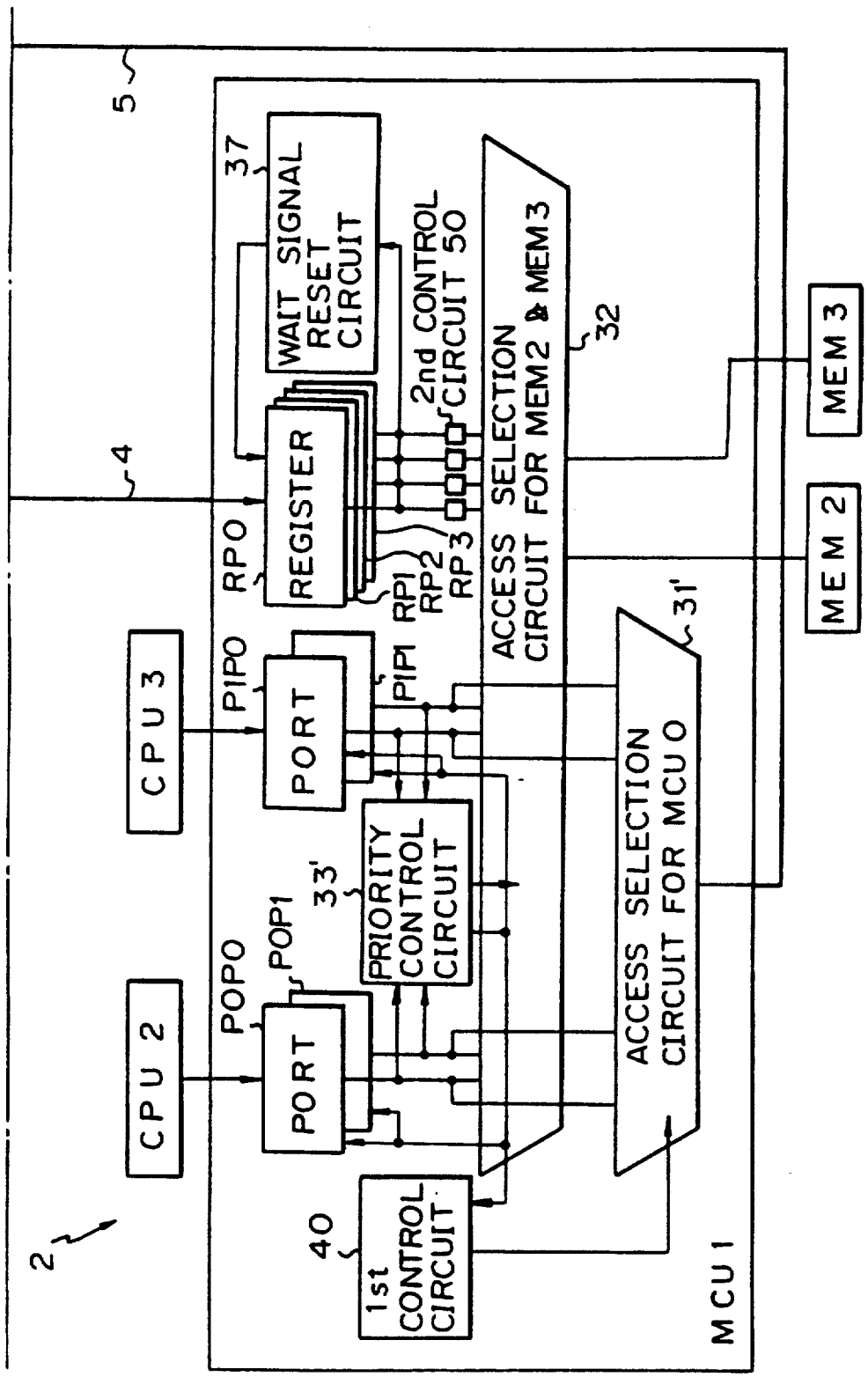

DATA PROCESSING SYSTEM WITH MEMORY-ACCESS PRIORITY CONTROL

This application is a continuation of application Ser. No. 07/346,556, filed May 2, 1989, now abandoned.

BACKGROUD OF THE INVENTION (1) Field of the invention

The present invention relates to a data processing system, more particularly, to a data processing system with memory access priority control means.

(2) Description of the Related Art

As is well known, the data processing system used in a computer system is constituted by a plurality of multi-processor systems, each of which comprises a plurality of central processing units, main memory units, and a memory control unit. The central processing units are connected to the main memory units through the memory control unit by interface lines, and each memory control unit is connected to each other memory control unit by interface lines.

In the conventional data processing system, when improving the data throughput, only the number of central processing units connected to the memory control unit is increased for processing a large amount of data in the multi-processor system. However, the number of central processing units that can be connected to the memory control unit is limited, for reasons concerning mass productivity and system expansion at a customer's office. Further, in the above described data processing system, it is demanded to speed up the access speed to the main memories which are commonly used by each central processing unit.

SUMMARY OF THE INVENTION

The object of the present invention is to provide a data processing system enabling an improved data throughput of the system by using the registers RP0, RP1, RP2, and RP3 effectively, and by enabling an effective and high speed access control for mutual data transmission.

According to the present invention, when a multi-processor system including a plurality of central processing units and a plurality of main memories both connected to a memory control unit accesses another multi-processor system, a priority in access requests from the same central processing unit to the other multi-processor system is detected, and registers to store the access request signals in the other multi-processor system are efficiently used by adding a priority control signal to the access request signal. As a result, data throughput of the system is improved.

BRIEF DESCRIPTION OF THE DRAWINGS

The present invention will be more clearly understood from the description as set forth below with reference to the accompanying drawings, wherein:

FIGS. 3A and 3B are basic block diagram of a memory control unit according to one embodiment of the present invention, of a data processing system constituted by two multi-processor systems;

DESCRIPTION OF THE PREFERRED EMBODIMENTS

Before describing the preferred embodiments, an explanation will be given of the conventional data processing system shown in FIGS. 1 and 2.

Figure 1:
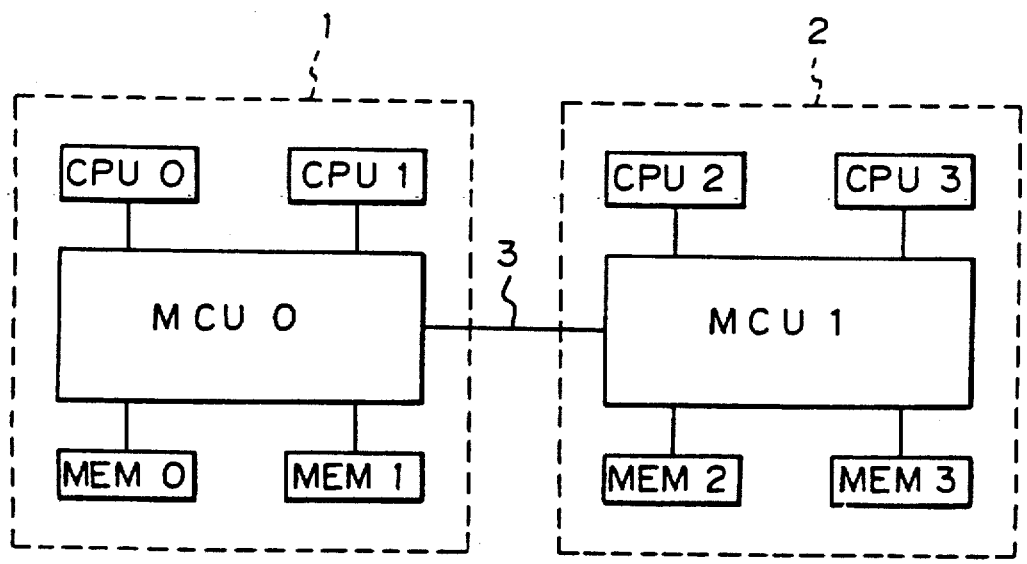
FIG. 1 is a schematic block diagram of a conventional data processing system constituted by two multi-processor systems.

FIG. 1 shows a conventional multi-processor system arrangement of a data processing system used in a computer system. Although a data processing system is generally constituted by a plurality of multi-processor systems, the data processing system of this example is constituted by two multi-processor systems, i.e., a first multi-processor system 1 and a second multi-processor system 2, to facilitate explanation of the prior art.

The first multi-processor system 1 comprises two central processing units CPU0 and CPU1, two main memory units MEM0 and MEM1, and a memory control unit MCU0. The second multi-processor system 2 comprises two central processing units CPU2 and CPU3, two main memory units MEM2 and MEM3, and a memory control unit MCU1. The memory control unit MCU0 of the first multi-processor 1 and the memory control unit MCU1 of the second mult-processor 2 are connected by the interface line 3 to exchange access request signals from CPU0, CPU1, CPU2, and CPU3, and data from main memories MEM0, MEM1, MEM2, and MEM3.

The basic processing operation of each multi-processor system is divided into an inner access and an outer access. In the inner access, the central processing unit of a given multi-processor system accesses the main memory of that system through the memory control unit of that same system; in outer access, the central processing unit accesses the main memory in the other system through the memory control units in the same system and in the other system. These operations of the first system 1 shown in FIG. 1 will be explained individually hereinafter.

(1) Inner access: When the central processing unit CPU0 requests access to the main memory unit MEM0 in the first system 1 for reading out the data stored in the main memory unit MEM0 (called a "fetch access"), first, an access request signal generated by the central processing unit CPU0 is transmitted to the memory control unit MCU0, second, the memory control unit MCU0 accesses the main memory MEM0, third, the main memory MEM0 reads out and transmits the data to the memory control unit MCU0, and fourth, the memory control unit MCU0 transmits the data to the central processing unit CPU0. When the central processing unit CPU0 requests access to the main memory unit MEM0 in the first system 1 for writing in the data in the central processing unit CPU0 (called a "store access"), first, an access request signal generated by the central processing unit CPU0 is transmitted to the memory control unit MCU0, second, the memory control unit MCU0 accesses the main memory unit MEM0, and third, the main memory unit MEM0 writes in the data and stores it.

(2) Outer access: When the central processing unit CPU0 requests access to the main memory unit MEM2 in the second system 2 for reading out the data stored in the main memory MEM2 (also a "fetch access"), first, an access request signal generated by the central processing CPU0 is transmitted to the memory control unit MCU0, second, the memory control unit MCU0 transmits the access request signal to the memory control unit MCU1, third, the memory control unit MCU1 accesses the main memory MEM2, fourth, the main memory MEM2 reads out and the transmits the data to the memory control unit MCU1, fifth, the memory control unit MCU1 transmits the data to the memory control unit MCU0, and sixth, the memory control unit MCU0 transmits the data to the central processing unit CPU0. When the central processing unit CPU0 requests access to the main memory MEM2 in the second system 2 for writing in the data stored in the central processing unit CPU0 (also a "store access"), first, an access request signal generated by the central processing unit CPU0 is transmitted to the memory control unit MCU0, second, the memory control unit MCU0 transmits the access request signal to the memory control unit MCU1, third, the memory control unit MCU1 accesses the main memory MEM2, and fourth, the main memory MEM2 writes in the data and stores it.

Figure 2:
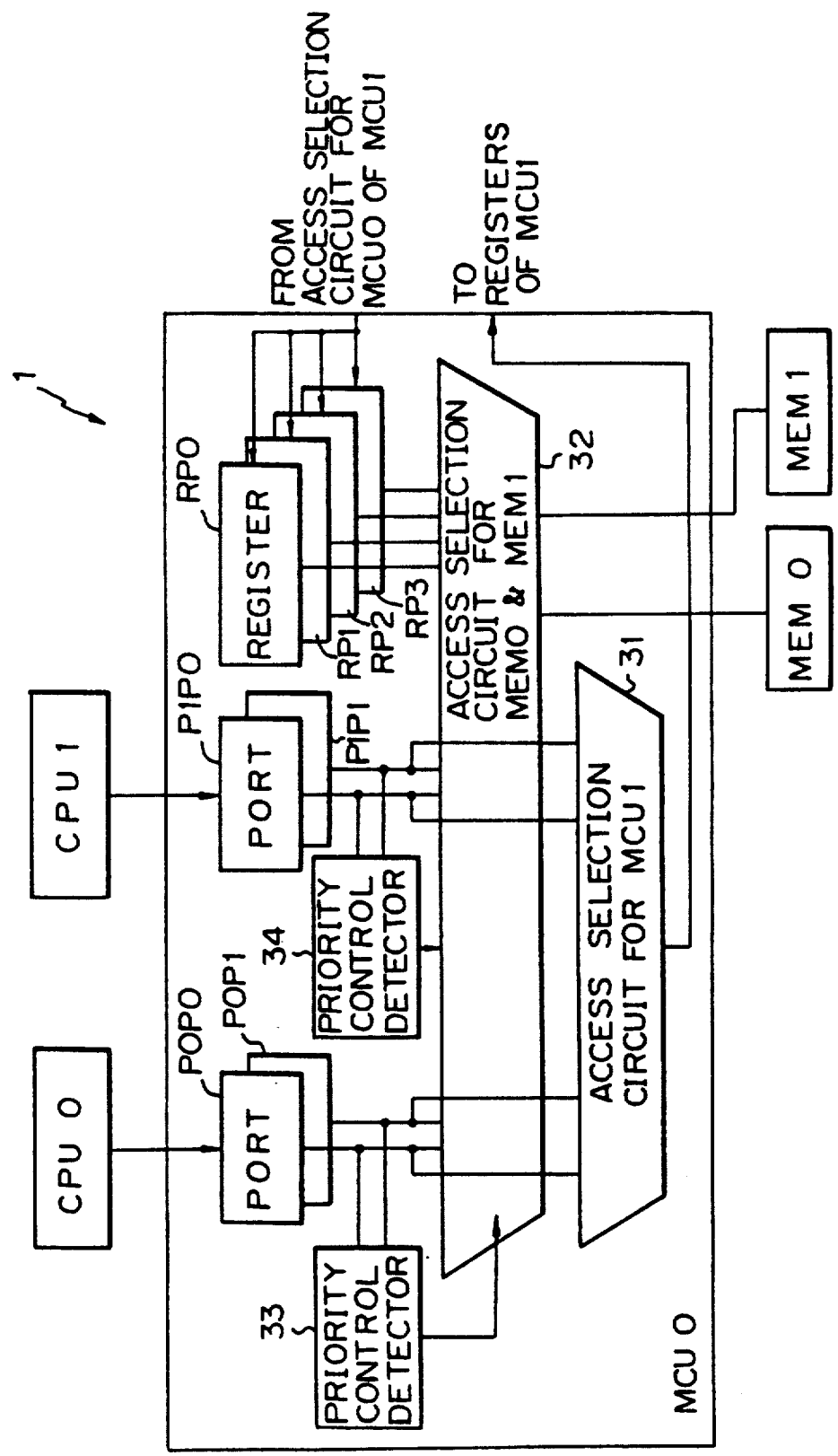
FIG. 2 is a basic block diagram of a memory control unit in FIG. 1.

FIG. 2 shows the inner construction of the memory control unit MCU0. In FIG. 2, P0P0, P0P1, P1P0, and P1P1 represent ports, RP0, RP1, RP2, and RP3 represent registers, 31 represents an access selection circuit for memory control unit MCU1, 32 represents an access selection circuit for main memories MEM0 and MEM1, and 33, 34 represent priority control detectors. The ports P0P0 and P0P1 are connected to the central processing unit CPU0 and the ports P1P0 and P1P1 are connected to the central processing unit CPU1. The registers RP0, RP1, RP2, and RP3 are connected to an access selection circuit for MCU0 of the memory control unit MCU1 in the second multi-processor system 2. The output of the ports P0P0 and P0P1 and the output of the ports P1P0 and P1P1 are input to the access selection circuit 31 or the access selection circuit 32. The output of the registers RP0, RP1, RP2, and RP3 are input to the access selection circuit 32. The output of the access selection circuit 31 is connected to the registers RP0, RP1, RP2, and RP3 of the memory control unit MCU1 in the second multi-processor system 2, and the output of the access selection circuit 32 is connected to the main memories MEM0 and MEM1. The priority control detectors 33 and 34 detect the stored request signals in the ports P0P0 and P0P1, and P1P0 and P1P1 to generate a priority control signal which is called a wait signal W.

When the access request signal generated by the central processing unit CPU0 is transmitted to the memory control unit MCU0, this request signal is set in one of the ports, for example, set in the port P0P0 first as a preceding access request signal. If this request signal is for inner access, the access request signal in the port P0P0 is input to the access selection circuit 32 for main memories MEM0 and MEM1. And if the request signal in the port P0P0 is for outer access, the access request signal is input to the access selection circuit 31 for memory control unit MCU1, and further the access request signal in the port P0P0 is held until the end of this outer access is confirmed by the confirmation signal returned from the memory control unit MCU1. If the following access request signal is input to the memory control unit MCU0 from the same central processing unit CPU0, while the preceding access request signal is held in the port P0P0, the following access request signal is set in the port P0P1.

If, the preceding and the following access request signals set in the ports P0P0 and P0P1 are both for inner access, the priority control detector 33 operates differently according to the variety of the access request signals in the ports P0P0 and P0P1 as shown in the table below.

| PRECEDING | FOLLOWING | OPERATION |
| --- | --- | --- |
| store access | fetch access | add wait signal W to following |
| fetch access | store access | add wait signal W to following |
| fetch access | fetch access | wait signal W is not generated |
| store access | store access | add wait signal W to following |

If, the preceding and the following access request signals set in the ports P1P0 and P1P1 are both for inner access, the priority control detector 34 operates in the same manner as the priority control detector 33.

Meanwhile, if the preceding and the following access request signals set in the ports P0P0 and P0P1 are both for outer access, the preceding and the following access request signals are transmitted to two of the registers RP0, RP1, RP2, and RP3 in the other multi-processor system with a restriction that the following request signal cannot be set in the register of a lower number than the number of register where the preceding request signal has been set. For example, if the preceding request signal from a central processing unit has been set in the register RP2, the following request signal from the same central processing unit has to be set in the resister RP3 and it cannot be set in the register RP0 or RP1 which have a lower number than the register RP2 at this time. This restriction is not executed when the preceding access request signal and the following access request signal are transmitted from different central processing unit, because priority control is necessary only for the sequential access from the same central processing unit.

However, in the above mentioned conventional data processing system, the registers RP0, RP1, RP2, and RP3 are not used effectively for the following reasons: (1) if the preceding request signal from a central processing unit has been set in the register RP3, the following request signal from the same central processing unit cannot be set in the resister RP0, RP1, or RP2 until the access request signal in the register RP3 is erased even if there is an unused register in the resisters RP0, RP1, or RP2 according to the above described restriction; (2) priority control is executed for every preceding access request signal and the following request signal from the same central processing unit even though the preceding access and the following access are both fetch accesses for which priority control is not necessary. For these reasons, there is a time loss for each multi-processor system to access the other multi-processor system in the conventional data processing system.

FIG. 3 shows a multi-processor system of a data processing system used in a computer system according to the present invention. Although a data processing system is generally constituted by a plurality of multi-processor systems, the data processing system of this example is constituted by two multi-processor systems, i.e., a first multi-processor system 1 and a second multi-processor system 2, to facilitate explanation of the this embodiment.

The first multi-processor system 1 comprises two central processing units CPU0 and CPU1, two main memory units MEM0 and MEM1, and a memory control unit MCU0. The second multi-processor system 2 comprises two central processing units CPU2 and CPU3, two main memory units MEM2 and MEM3, and a memory control unit MCU1. And the memory control unit MCU0 of the first multi-processor 1 and the memory control unit MCU1 of the second multi-processor 2 are connected by the interface lines 4 and 5 to exchange access request signals from CPU0, CPU1, CPU2, and CPU3, and data from main memories MEM0, MEM1, MEM2, and MEM3.

The basic processing operation of each multi-processor system is divided into an inner access and an outer access. In inner access, the central processing unit accesses the main memory in the same system through the memory control unit, and in outer access, the central processing unit accesses the main memory in other system through the memory control units in the same system and in the other system. In these operations of the data processing system according to the present invention, the inner access is just the same as the conventional data processing system shown in FIGS. 1 and 2, so that only the outer operations of the multi-processor system shown in FIG. 3 will be explained after the explanation of an inner construction of memory control units MCU0 and MCU1.

In FIG. 3, P0P0, P0P1, P1P0, and P1P1 represent ports, RP0, RP1, RP2, and RP3 represent registers, 31 represents an access selection circuit for memory control unit MCU1 or MCU0, 32 represents an access selection circuit for main memories MEM0 and MEM1, or MEM2 and MEM3, 33 represents a priority control circuit, 37 represents a wait signal reset circuit, 40 represents a first control circuit, and 50 represents a second control circuit. The ports P0P0 and P0P1 are connected to one of the central processing unit CPU's, and the ports P1P0 and P1P1 are connected to the other central processing unit CPU in the system. The registers RP0, RP1, RP2, and RP3 are connected to an access selection circuit 31 in the other multi-processor system. The output of the ports P0P0 and P0P1 and the output of the ports P1P0 and P1P1 are input to the access selection circuit 31 or the access selection circuit 32. The output of the registers RP0, RP1, RP2, and RP3 are input to the access selection circuit 32 for main memory in the same system through the second control circuit 50. The output of the access selection circuit 31 is input to the registers RP0, RP1, RP2, and RP3 of the other system, and the output of the access selection circuit 32 is input to the main memories of the same system. The priority control circuit is connected to the ports P0P0, P0P1, P1P0, and P1P1 to detect the priority of access request signals from the same central processing unit. The first control circuit 40 is connected between the priority control circuit and the access selection circuit 31 to transmit a wait signal together with the following access request signal when priority control is detected to be necessary by the priority control circuit 33.

When a central processing unit CPU requests access to one of the main memory units MEM in other system for reading out the data stored in one of the main memory MEM (called a "fetch access") as a preceding access request, first, the preceding access request signal is set in a port of a memory control unit MCU of this system, second, the preceding access request signal is transmitted to the other memory control unit MCU through an access selection circuit 31, and third, it is set in an unused register RP of the other system. The preceding access request signal is held in the port after it is transmitted to the other system. When the same central processing unit CPU requests access to one of the main memories MEM in the other system for writing in the data stored in the central processing unit CPU (called a "store access") as a following access request, first, the following access request signal is set in another port of the memory control unit MCU of this system, second, the preceding and the following access request signals are compared by a priority control circuit 33, third, the priority control circuit 33 generates a wait signal W, fourth, the following access request signal is transmitted to the other memory control unit MCU through an access selection circuit 31 with the wait signal by the operation of the first control circuit 40, and fifth, they are set in an unused register RP of the other system unrelated to the position where the preceding access request signal has already been set.

The same operation is executed when the preceding access request is the "store access" and the following access request is the "fetch access", and when the preceding access request and the following access request are both the "store access". However, when the preceding access request and the following access request are both the "fetch access", the priority control circuit 33 doesn't generate the wait signal W, then the following access request signal is transmitted to the other memory control unit MCU through an access selection circuit without the wait signal by the operation of the first control circuit 40. At this time, the following access request signal is also set in an unused register RP of the other system unrelated to the position of the preceding access request signal in the register.

In the other multi-processor system, the preceding access request signal (an access request singnal without the wait signal) in the register is transmitted to the access selection cirucuit 32 prior to the following access request signal (an access request signal with the wait signal) by the operation of the second control circuit 50. When the preceding access request signal is transmitted from the register and the end of an access by that access request signal is confirmed, the wait signal of the following access request signal is erased by the operation of the wait signal reset circuit 37.

Thus, in accordance with the structure and method of the present invention, it is possible to improve data throughput of the system by using the registers of the other system effectively, and by enabling an effective and high speed access control for mutual data transmission.

Figure 3A:
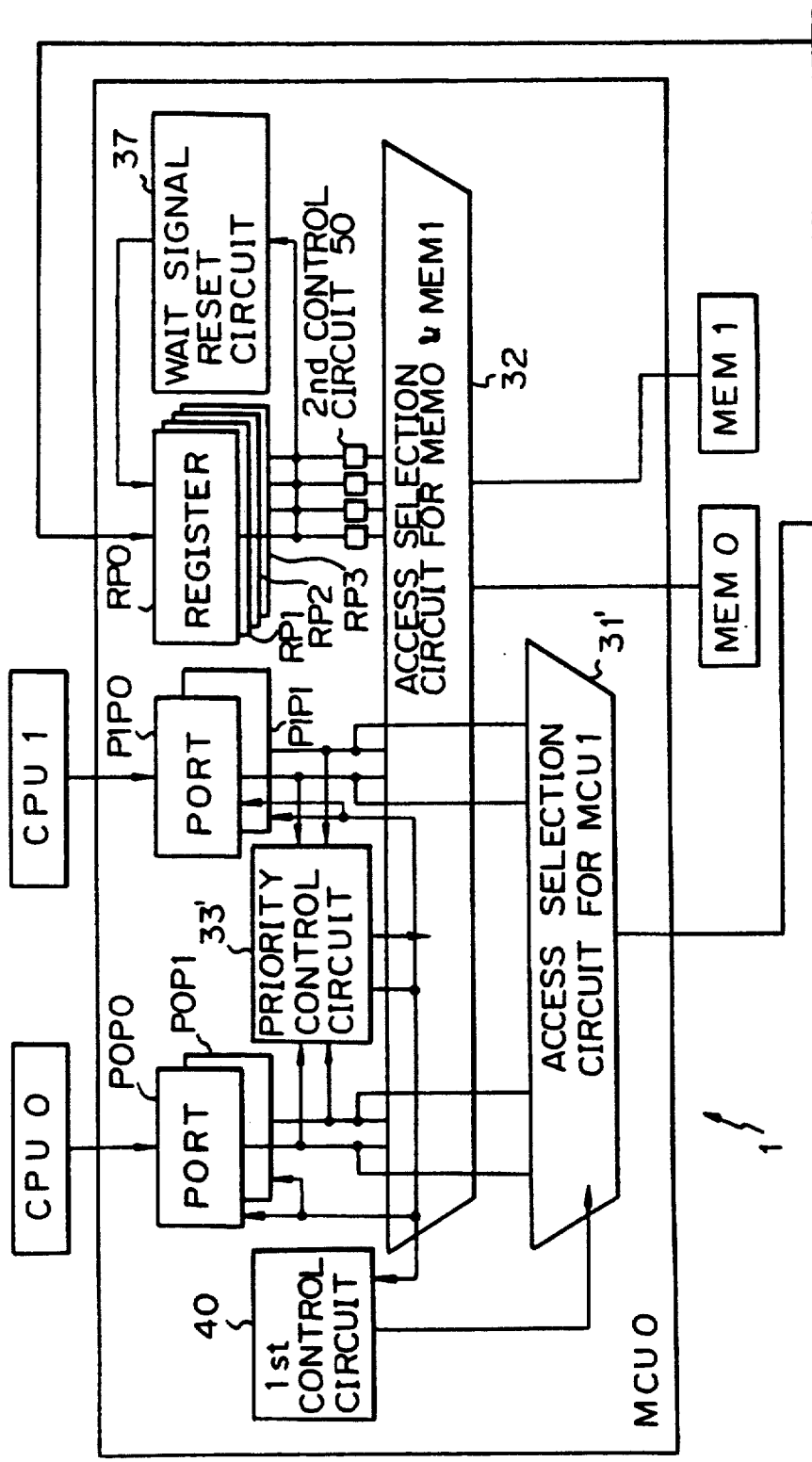
Figure 4:
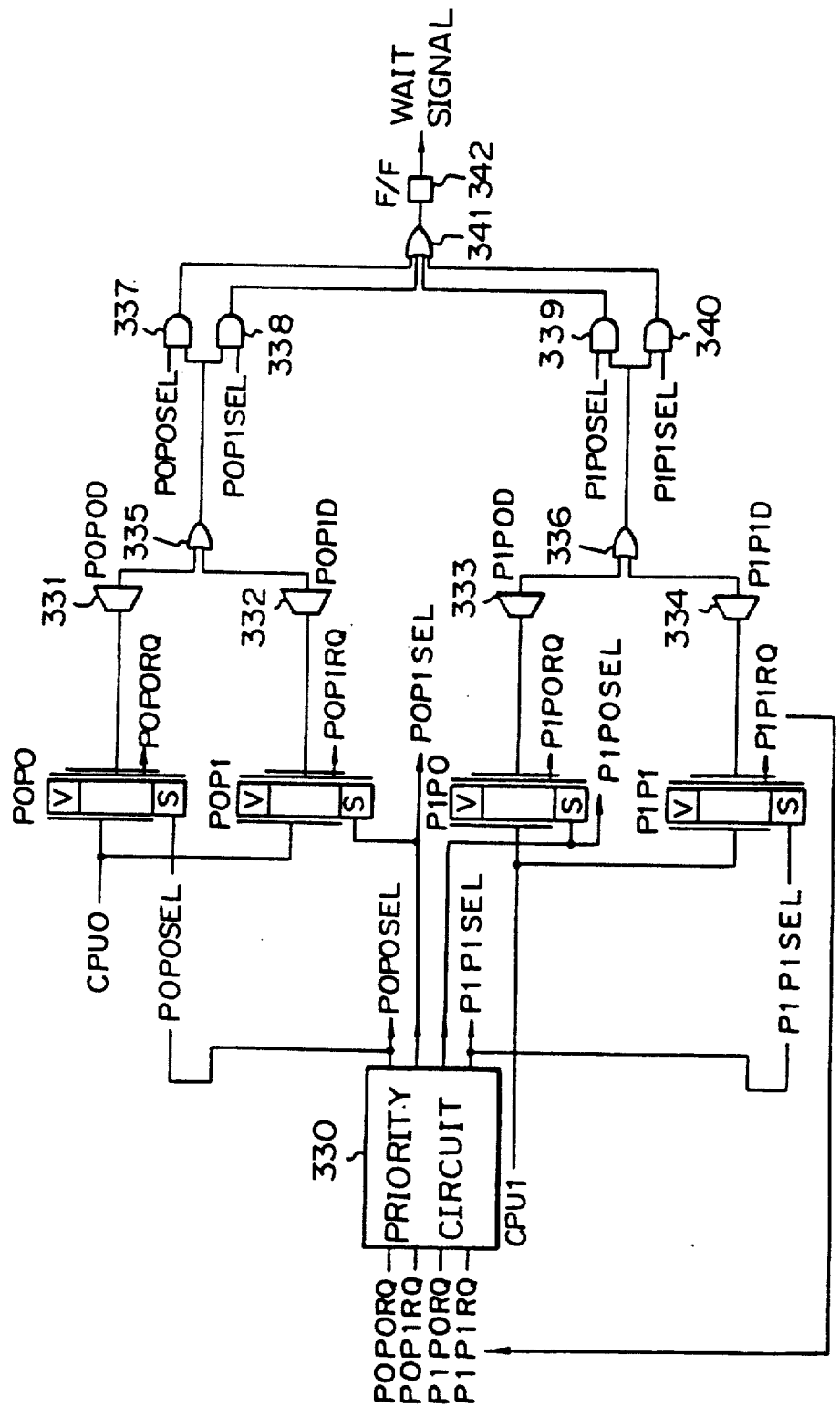
FIG. 4 is a circuit diagram of a priority control circuit as incorporated in each of FIGS. 3A and 3B according to one embodiment of the present invention.

FIG. 4 is a detailed circuit diagram of one embodiment of a priority control circuit 33 shown in FIG. 3. In FIG. 3, 330 represents a priority circuit, 331 to 334 represent decoders, 335, 336, and 341 represent OR gates, 337 to 340 represent AND gates, and 342 represents a flip-flop. The access request signal including an operation code from the central processing unit CPU0 is set in the ports P0P0 or P0P1, and the access request signal from the central processing unit CPU1 is set in the ports P1P0 or P1P1. Each access request signal (shown by P0P0RQ, P0P1RQ, P1P0RQ, and P1P1RQ in FIG. 4) in the ports is branched and transmitted to the priority circuit 330, and a select signal (shown by P0P0SEL, P0P1SEL, P1P0SEL, or P1P1SEL in FIG. 4) is generated according to the priority of the access request signals. When a preceding access request signal is transmitted in the port P0P0 (the port P0P1 is empity), the select signal P0P0SEL is generated in the priority circuit 330. After the port P0P0 is selected by this select signal P0P0SEL, a bit S is set to "1" by the select signal P0P0SEL. Accordingly, the bit S indicates a selection possibilety and the port with "1" level in the bit S cannot be selected. Note that, if the access request signal is for inner access, the bit S of the port is set to "1" by force when the access request signal is set to the port, thereby transmission of the signal from this port to the other system does not occur. The operation code in each access request signal is transmitted to the decoder 331 to 334, to be detected whether or not priority control is necessary. If the access request signal is for "store access", it is detected that priority control is necessary, but if the access request signal is for "fetch access", it is detected that priority control is not necessary according to the operation code.

If the access request signal which needs priority control exists in one of the ports connected to the same central processing unit, this access request signal is selected by the select signal and a wait signal W is generated at this time as follows. When a preceding access request signal P0P0RQ in the port P0P0 is for "store access", and a following access request signal P0P1RQ in the port P0P1 is for "fetch access", the decoder 331 outputs the priority signal P0P0D (high level "1") by detecting the operation code which indicates "store access" from the port P0P0, but the decoder 332 doesn't output the priority signal P0P0D because the operation code from the port P0P0 indicates "fetch access". The priority signal P0P0D is transmitted to the AND gate 337 and 338 through the OR gate 335. On the other hand, the access request signals P0P0RQ and P0P1RQ are both transmitted to the priority circuit 330, then the access request signal P0P1RQ is selected and the select signal P0P1SEL (high level "1") is generated. The select signal P0P1SEL is transmitted to the port P0P1 and the AND gate 338. In this way, an output signal is generated at the AND gate 338, and this output signal becomes a wait signal W of high level "1" through the OR gate 341 and the flip-flop 342.

Figure 5:
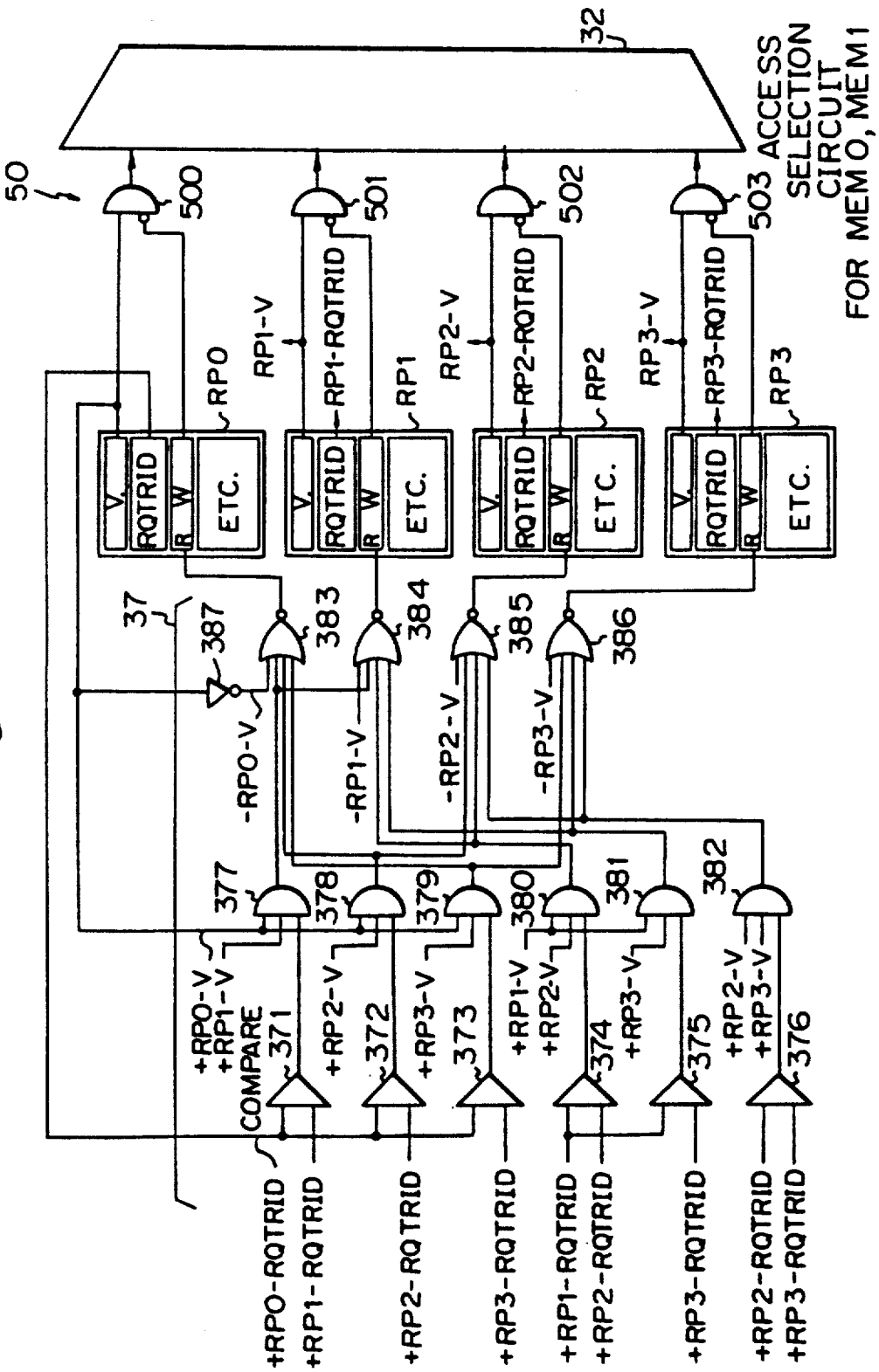
FIG. 5 is a partial circuit diagram of the memory control unit as incorporated in each of FIGS. 3A and 3B.

In FIG. 5 there is illustrated a detailed circuit diagram of one embodiment of the wait signal reset circuit 37 and second control circuit 50 shown in FIG. 3, together with the registers RP0 to RP3 and the access selection circuit 32 in each memory control unit. The wait signal reset circuit 37 includes six comparators 371 to 376 for detecting whether or not sources of two access request signals are the same central processing unit by comparing two requester ID signal RQTRID, six AND gates 377 to 382, four NOR gates, and four inverters (only one inverter 387 is shown in FIG. 5), and the second control circuit 50 is composed of four AND gates 500 to 503. In each register RP, V represents a valid signal storing area, RQTRID represents a storing area for requester ID signal which identifies a signal source, W represents a wait signal storing area, and ETC. represents another storing area. The requester ID signal is set in the RQTRID of the register RP when the contents of a port is transmitted to the register, because each port has a ID signal generating means (not shown in FIG. 4) and the requester ID signal is transmitted to the register RP in the other systemu together with the other informations. In FIG. 5, +RPi−RQTRID (i is 0, 1, 2, or 3) represents the requester ID signal from the register RPi, which indicates the source of the access request signal, for example, the source is the central processing unit CPU0, +RPi−V represents the valid signal from the register RPi, and −RPi−V represents the inverted valid signal from the register RPi. Six comparators 371 to 376 are provided to compare every combination of the requester ID signal from four registers RP0 to RP3, and every comparator outputs a high level signal "1" when two input requester ID's indicate the same source. Six AND gates 377 to 382 are provided to obtain a logical product of every combination of the requester ID signal and the valid signal from four registers RP0 to RP3. Each output signal of the AND gates 377 to 382 is transmitted to a reset terminal of the wait signal storing area corresponding to the input signal through the corresponding NOR gate.

The operation of the second control circuit 50 is explained below under the condition that the preceding access request signal is set in the register RP0, and the following access request signal is set in the register RP1 with the wait signal W. The AND gate 500 transmits a high level signal "1" to the access selection circuit 32 since the valid signal is high and the wait signal is low at register RP0, while the AND gate 501 transmits a low level signal "0" to the access selection circuit 32 since the valid signal is high level and the wait signal is high level at register RP1. In this way, the access selsction circuit 32 can access one of the main memories according to the access request signal from the register RP0 prior to the access request signal from the register RP1.

The reset operation of the wait signal reset circuit 37 is next explained below under the condition that the preceding access request signal from the central processing unit CPU1 is set in the register RP0, the following access request signal from the central processing unit CPU1 is set in the register RP1 with the wait signal W, and the access request signal from the central processing unit CPU0 is not set in other registers.

(1) Before the access by the preceding access request signal stored in the register RP0 is not operated, the logic level of each valid signal is as follows.

| RP0−V :"1" | RP1−V :"1" | RP2−V :"0" | RP3−V :"0" |
|---|---|---|---|
| −RP0−V :"0" | −RP1−V :"0" | −RP2−V :"1" | −RP3−V :"1". |

And RP0−RQTRID and RP1−RQTRID indicate that the source of the access request signal is the central processing unit CPU1. In this condition, only the comparator 371 outputs the high level signal "1", and only the AND gate 377 outputs the high level signal "1". Accordingly, every NOR gate outputs a low level signal "0", so that none of the wait signals is reset.

(2) When the access by the preceding access request signal stored in the register RP0 is finished, the valid signal in the port P0P0 is reset, and then the signal RP0−V is changed from high "1" to low "0" and the signal −RP0−V is changed from low "0" to high "1". Then the output of the AND gate 378 changes from low "0" to high "1". This change causes the output level of the NOR gate 384 change from low "0" to high "1", thereby resetting the wait signal W in the register RP1. In this way, the wait signal of the following access request signals is reset by the wait signal reset circuit 37.

I claim:

1. A data processing system, having a plurality of multi-processor systems with respective main memories and a plurality of interface lines interconnecting said plurality of multi-processor systems, for processing inner and outer access request signals and for selective transmission of data therebetween, each of said multi-processor systems processing both inner access request signals requesting access to the respective main memory thereof and also outer access request signals requesting access to the respective main memory of a different multi-processor system, of the plurality thereof, of the data processing system and comprising:

at least one access request generating means for selectively generating inner and outer access request signals, each inner access request signal designating the respective said multi-processor system and the function of access to said respective main memory means thereof and each outer access request signal designating a specific, different said multi-processor system of said plurality thereof and the function of access to said respective main memory of said different multi-processor system and each said access request signal furthermore selectively specifying one of data fetch and data store operations to be performed, selectively and correspondingly, at the respective main memory of the multi-processor system designated thereby; and a memory control unit connected to said respective main memory means and said respective access request generating means and to said interface lines, said interface lines thus being connected to said respective memory control units of said plurality of multi-processor systems of said data processing system, each said memory control unit further comprising:

signal storing means for receiving and storing access request signals generated by said at least one access request generating means and including, for each said access generating means, corresponding first and second storing means, wherein first and second successive access request signals generated by an individual said access request generating means are stored, respectively, by said corresponding first and second storing means as a set of preceding and following access control signals, said signal storing means storing said access request signals until confirmation that the memory access function and operation requested thereby is completed, priority control means for detecting the necessity of performing priority control with respect to each said stored set of preceding and following access request signals generated by said individual access request generating means, in accordance with both said stored signals of said set designating access to the same said multi-processor system and in accordance with the data fetch and data store operations selectively and respectively specified by said stored signals of said set, and for generating a priority control signal for each said stored set of preceding and following access request signals upon detecting the necessity of priority control therefore, first access selection means, responsive to each stored set of preceding and following outer access request signals which commonly designate a specific, different said multi-processor system, for transmitting corresponding preceding and following access request signals to said thereby designated, different multi-processor system, first control means, responsive to the generation of a priority control signal by said priority control means for a respective, said stored set of preceding and following outer access request signals, for controlling said first access selection means to transmit said priority control signal in accompanying relationship with the transmission of said corresponding following access request signal of said set to said memory control unit of said thereby designated, different multi-processor system, plural register means, operable when said respective multi-processor system is designated by a set of preceding and following, outer access request signals generated by the respective access request generating means of a different said multi-processor system, for receiving and separately storing in respective said register means of said plurality thereof, said corresponding, preceding and following access request signals and any said accompanying priority control signal as generated and transmitted thereto by the respective first access selection means of said different multi-processor system, second access selection means for selectively responding to each of said inner access request signals as transmitted thereto for providing the thereby requested access to said respective main memory of said respective multi-processor system and for performing the thereby specified memory operation, and second control means for selectively transmitting access request signals, as separately stored in said plural register means, to said second access selection means of said respective multi-processor system, said second control means being responsive to each said set of corresponding preceding and following access request signals having an accompanying priority control signal, stored in said register means, for inhibiting transmission of said following access request signal to said second access selection circuit while said preceding access request signal of said stored set remains stored in said respective said register means and for enabling transmission of said following access request signal of said stored set to said second access selection circuit upon completion of the memory access function and operation designated and specified by said preceding access request signal of said set.

2. A data processing system as set forth in claim 1, wherein said second control means includes erase means for erasing said priority control signal, accompanying and stored with said following access request signal in said respective said register means, from said respective said register means upon completion of performance of the memory access function and operation designated and specified by said preceding access request signal of said set.

3. A data processing system as set forth in claim 1, wherein said second control means stores said access request signal, as received thereby from a different said multi-processing system, at random in an empty one of said plural register means.

4. A data processing system as set forth in claim 1, wherein said priority control means determines the necessity of priority control and accordingly generates said priority control signal, for a given said set of said preceding and following access request signals, when the successive, preceding and following access request signals selectively and respectively specify one of: (1) data store and data fetch operations, (2) data fetch and data store operations, and (3) data store and data store operations.

5. A data processing system as set forth in claim 1, wherein said priority control means determines the necessity of priority control and accordingly generates said priority control signal, for a given said set of preceding and following access request signals, when at least one of the successive, preceding and following access request signals specifies a data store operation.

* * * * *

UNITED STATES PATENT AND TRADEMARK OFFICE
CERTIFICATE OF CORRECTION

PATENT NO. : 5,218,688

DATED : June 8, 1993

INVENTOR(S) : Nishida

It is certified that error appears in the above-indentified patent and that said Letters Patent is hereby corrected as shown below:

Columns 1 through 12 should be deleted to be substituted with the corrected columns 1 through 12, as shown on the attached pages.

Signed and Sealed this

Thirteenth Day of December, 1994

Attest:

BRUCE LEHMAN

Attesting Officer　　Commissioner of Patents and Trademarks

DATA PROCESSING SYSTEM WITH MEMORY-ACCESS PRIORITY CONTROL

This application is a continuation of application Ser. No. 07/346,556, filed May 2, 1989, now abandoned.

BACKGROUND OF THE INVENTION

(1) Field of the Invention

The present invention relates to a data processing system, more particularly, to a data processing system with memory access priority control means.

(2) Description of the Related Art

As is well known, the data processing system used in a computer system is constituted by a plurality of multi-processor systems, each of which comprises a plurality of central processing units, main memory units, and a memory control unit. The central processing units are connected to the main memory units through the memory control unit by interface lines, and each memory control unit is connected to each other memory control unit by interface lines.

In the conventional data processing system, when improving the data throughput, only the number of central processing units connected to the memory control unit is increased for processing a large amount of data in the multi-processor system. However, the number of central processing units that can be connected to the memory control unit is limited, for reasons concerning mass productivity and system expansion at a customer's office. Further, in the above described data processing system, it is demanded to speed up the access speed to the main memories which are commonly used by each central processing unit.

SUMMARY OF THE INVENTION

The object of the present invention is to provide a data processing system enabling an improved data throughput of the system by using the registers RP0, RP1, RP2, and RP3 effectively, and by enabling an effective and high speed access control for mutual data transmission.

According to the present invention, when a multi-processor system including a plurality of central processing units and a plurality of main memories both connected to a memory control unit accesses another multi-processor system, a priority in access requests from the same central processing unit to the other multi-processor system is detected, and registers to store the access request signals in the other multi-processor system are efficiently used by adding a priority control signal to the access request signal. As a result, data throughput of the system is improved.

BRIEF DESCRIPTION OF THE DRAWINGS

The present invention will be more clearly understood from the description as set forth below with reference to the accompanying drawings, wherein:

FIG. 1 is a schematic block diagram of a conventional data processing system constituted by two multi-processor systems;

FIG. 2 is a basic block diagram of a memory control unit in FIG. 1;

FIGS. 3A and 3B are basic block diagram of a memory control unit, according to one embodiment of the present invention, of a data processing system constituted by two multi-processor systems;

FIG. 4 is a circuit diagram of a priority control circuit as incorporated in each of FIGS. 3A and 3B according to one embodiment of the present invention;

FIG. 5 is a partial circuit diagram of the memory control unit as incorporated in each of FIGS. 3A and 3B.

DESCRIPTION OF THE PREFERRED EMBODIMENTS

Before describing the preferred embodiments, an explanation will be given of the conventional data processing system shown in FIGS. 1 and 2.

FIG. 1 shows a conventional multi-processor system arrangement of a data processing system used in a computer system. Although a data processing system is generally constituted by a plurality of multi-processor systems, the data processing system of this example is constituted by two multi-processor systems, i.e., a first multi-processor system 1 and a second multi-processor system 2, to facilitate explanation of the prior art.

The first multi-processor system 1 comprises two central processing units CPU0 and CPU1, two main memory units MEM0 and MEM1, and a memory control unit MCU0. The second multi-processor system 2 comprises two central processing units CPU2 and CPU3, two main memory units MEM2 and MEM3, and a memory control unit MCU1. The memory control unit MCU0 of the first multi-processor 1 and the memory control unit MCU1 of the second multi-processor 2 are connected by the interface line 3 to exchange access request signals from CPU0, CPU1, CPU2, and CPU3, and data from main memories MEM0, MEM1, MEM2, and MEM3.

The basic processing operation of each multi-processor system is divided into an inner access and an outer access. In the inner access, the central processing unit of a given multi-processor system accesses the main memory of that system through the memory control unit of that same system; in the outer access, the central processing unit of a given one of plural multi-processor systems accesses the main memory of a different system, through the memory control units of the given system and the different system. These operations of the first system 1 shown in FIG. 1 will be explained individually hereinafter.

(1) Inner access: When the central processing unit CPU0 requests access to the main memory unit MEM0 in the first system 1 for reading out the data stored in the main memory unit MEM0 (called a "fetch access"), first, an access request signal generated by the central processing unit CPU0 is transmitted to the memory control unit MCU0, second, the memory control unit MCU0 accesses the main memory MEM0, third, the main memory MEM0 reads out and transmits the data thus read-out to the memory control unit MCU0, and fourth, the memory control unit MCU0 transmits the data to the central processing unit CPU0. When the central processing unit CPU0 requests access to the main memory unit MEM0 in the first system 1 for writing, into the unit MEM0, the data in the central processing unit CPU0 (called a "store access"), first, an access request signal generated by the central processing unit CPU0 is transmitted to the memory control unit MCU0, second, the memory control unit MCU0 accesses the main memory unit MEM0, and third, the main memory unit MEM0 writes in the data, as transmitted thereto from the central processing unit CPU0 (which requested the access), and thereby stores it.

(2) Outer access: When the central processing unit CPU0 requests access to the main memory unit MEM2 in the second system 2 for reading out the data stored in that main memory MEM2 (also a "fetch access"), first, an access request signal generated by the central processing CPU0 is transmitted to the memory control unit MCU0, second, the memory control unit MCU0 transmits the access request signal to the memory control unit MCU1, third, the memory control unit MCU1 accesses the main memory MEM2, fourth, the main memory MEM2 reads out and transmits the data to the memory control unit MCU1, fifth, the memory control unit MCU1 transmits the data to the memory control unit MCU0, and sixth, the memory control unit MCU0 transmits the data to the central processing unit CPU0. When the central processing unit CPU0 requests access to the main memory MEM2 in the second system 2 for writing in the data stored in the central processing unit CPU0 (also a "store access"), first, an access request signal generated by the central processing unit CPU0 is transmitted to the memory control unit MCU0, second, the memory control unit MCU0 transmits the access request signal to the memory control unit MCU1, third, the memory control unit MCU1 accesses the main memory MEM2, and fourth, the main memory MEM2 writes in the data and stores it.

FIG. 2 shows the inner construction of the memory control unit MCU0. In FIG. 2, P0P0, P0P1, P1P0, and P1P1 represent ports, RP0, RP1, RP2, and RP3 represent registers, 31 represents an access selection circuit for memory control unit MCU1, 32 represents an access selection circuit for main memories MEM0 and MEM1, and 33, 34 represent priority control detectors. The ports P0P0 and P0P1 are connected to the central processing unit CPU0 and the ports P1P0 and P1P1 are connected to the central processing unit CPU1. The registers RP0, RP1, RP2, and RP3 are connected to an access selection circuit for MCU0, of the memory control unit MCU1 in the second multi-processor system 2. The respective outputs of the ports P0P0 and P0P1 and of the ports P1P0 and P1P1 are input to the access selection circuit 31 or the access selection circuit 32. The respective outputs of the registers RP0, RP1, RP2, and RP3 are input to the access selection circuit 32. The output of the access selection circuit 31 is connected to the registers RP0, RP1, RP2, and RP3 of the memory control unit MCU1 in the second multi-processor system 2 (i.e., see FIG. 1), and the output of the access selection circuit 32 is connected to the main memories MEM0 and MEM1 of the given system 1. The priority control detectors 33 and 34 detect the respective request signals transmitted from CPU0 and CPU1 and stored in the ports P0P0 and P0P1, and P1P0 and P1P1, and each generates a priority control signal which is called a wait signal W.

When the access request signal generated by the central processing unit CPU0 is transmitted to the memory control unit MCU0, this request signal is set in one of the ports, for example in the port P0P0, as a preceding access request signal. If this request signal is for inner access, the access request signal thus set in the port P0P0 is input to the access selection circuit 32 for main memories MEM0 and MEM1. Conversely, if the request signal set in the port P0P0 is for outer access, the access request signal is input to the access selection circuit 31 for memory control unit MCU1, and further, the access request signal in the port P0P0 is held until the completion of this outer access is confirmed by a confirmation signal returned from the memory control unit MCU1. If a following access request signal is input to the memory control unit MCU0 from the same central processing unit CPU0 while the preceding access request signal is held in the port P0P0, the following access request signal is set in the port P0P1.

If the preceding and the following access request signals, as thus set in the ports P0P0 and P0P1, are both for inner access, the priority control detector 33 operates differently, according to which of the variety of types of access request signals are stored respectively in the ports P0P0 and P0P1, as shown in the table below.

| PRECEDING | FOLLOWING | OPERATION |
| --- | --- | --- |
| store access | fetch access | add wait signal W to following |
| fetch access | store access | add wait signal W to following |
| fetch access | fetch access | wait signal W is not generated |
| store access | store access | add wait signal W to following |

If the preceding and the following access request signals, as respectively set in the ports P1P0 and P1P1, are both for inner access, the priority control detector 34 associated with the port P1P1 operates in the same manner, as before-described, as the priority control detector 33 associated with the port P0P1.

Meanwhile, if the preceding and the following access request signals respectively set in the ports P0P0 and P0P1 are both for outer access, the preceding and the following access request signals are transmitted respectively to two of the registers RP0, RP1, RP2, and RP3 in the memory control unit of the other multi-processor system (i.e., MCU1 of system 2 in FIG. 1) with a restriction that the following request signal cannot be set in the register (i.e., one of the registers RP0, ... RP3 of MCU1 of system 2 in FIG. 1) of a lower number than the number of the register in which the preceding request signal has been set. For example, if the preceding request signal from a central processing unit has been set in the register RP2, the following request signal from the same central processing unit has to be set in the register RP3 and it cannot be set at this time in the register RP0 or RP1, both of which have a lower number than the register RP2. This restriction is not executed when the preceding access request signal and the following access request signal are transmitted from different central processing units, because priority control is necessary only for processing of sequential access requests from the same central processing unit.

However, in the above mentioned conventional data processing system, the registers RP0, RP1, RP2, and RP3 are not used effectively for the following reasons: (1) if the preceding request signal from a central processing unit has been set in the register RP3, the following request signal from the same central processing unit cannot be set in the register RP0, RP1, or RP2 until the access request signal in the register RP3 is erased, and thus even if there is an unused register in the register RP0, RP1, or RP2, according to the above described restriction; (2) priority control is executed for every sequence of preceding access request signal and a following access request signal from the same central processing unit, even though the preceding access and the following access requests are both fetch accesses for which priority control is not necessary. For these reasons, there is a time loss associated with each multiprocessor system when accessing another multi-processor system when accessing another in the conventional data processing system.

The composite of FIGS. 3A and 3B shows a multi-processor system of a data processing system used in a computer system according to the present invention. Although a data processing system is generally constituted by a plurality of multi-processor systems, the data processing system of this example is constituted by two multi-processor systems, i.e., a first multi-processor system 1 and a second multi-processor system 2, to facilitate explanation of this embodiment.

The first multi-processor system 1 comprises two central processing units CPU0 and CPU1, two main memory units MEM0 and MEM1, and a memory control unit MCU0. The second multi-processor system 2 comprises two central processing units CPU2 and CPU3, two main memory units MEM2 and MEM3, and a memory control unit MCU1. The memory control unit MCU0 of the first multi-processor 1 and the memory control unit MCU1 of the second multi-processor 2 are connected by the interface lines 4 and 5, respectively to exchange access request signals from CPU0, CPU1, CPU2, and CPU3, and data from main memories MEM0, MEM1, MEM2, and MEM3.

The basic processing operation of each multi-processor system is divided into an inner access and an outer access. In inner access, the central processing unit of a given system accesses the main memory of that system through the associated memory control unit, and in outer access. the central processing unit of one system accesses the main memory in other system through the respective memory control units of the given system and the other system. In these operations of the data processing system according to the present invention, the inner access is just the same as that of the conventional data processing system shown in FIGS. 1 and 2, so that only the outer access operations of the multi-processor system shown in FIGS. 3A and 3B will be explained after the explanation of the internal construction of memory control units MCU0 and MCU1.

In FIGS. 3A and 3B, P0P0, P0P1, P1P0, and P1P1 represent ports, RP0, RP1, RP2, and RP3 represent registers, 31' represents an access selection circuit for memory control unit MCU1 (FIG. 3A) or MCU0 (FIG. 3B), 32 represents an access selection circuit for main memories MEM0 and MEM1 (FIG. 3A), or MEM2 and MEM3 (FIG. 3B), 33' represents a priority control circuit, 37 represents a wait signal reset circuit, 40 represents a first control circuit, and 50 represents a second control circuit. The ports P0P0 and P0P1 are connected to a respectively corresponding one of the central processing units (CPU's), and the ports P1P0 and P1P1 are connected to the other, respectively corresponding one of the central processing units (CPU's) respectively associated with the systems 1 and 2. The registers RP0, RP1, RP2, and RP3 of one of the multi-processor systems are connected to the access selection circuit 31' of the other multi-processor system. The outputs of the ports P0P0 and P0P1 and the outputs of the ports P1P0 and P1P1 are input to the access selection circuit 31' or the access selection circuit 32. The outputs of the registers RP0, RP1, RP2, and RP3 of a given system are input to the access selection circuit 32 for main memory of that same, given system through the corresponding second control circuit 50. The output of the access selection circuit 31' is input to the registers RP0, RP1, RP2, and RP3 of the other system, and the output of the access selection circuit 32 of a given system is input to the main memories of that same, given system. The priority control circuit 33' of each, given system is connected to the associated ports P0P0, P0P1, P1P0, and P1P1 to detect the priority of access request signals from the associated central processing units of that same, given system. Further, in each system, the first control circuit 40 is connected between the priority control circuit 33' and the access selection circuit 31' of that same, given system, to transmit a wait signal together with the following access request signal when priority control is detected to be necessary by the associated priority control circuit 33'.

When a central processing unit CPU of one, given system requests access to one of the main memory units MEM of a different (i.e., the other) system for reading out the data stored therein (called a "fetch access") as a preceding access request, first, the preceding access request signal is set in a the corresponding port of a the associated memory control unit MCU of that given system, second, the preceding access request signal is transmitted to the memory control unit MCU of the other system, through the access selection circuit 31' of the given system, and third, the request signal, thus transmitted, is set in an unused register RP of the other system. The preceding access request signal also is held in the corresponding port, as aforesaid, after it is transmitted to the other system. When the same central processing unit CPU requests access to one of the main memories MEM is the other system for writing in the data stored in that same central processing unit CPU (called a "store access") as a following access request, first, the following access request signal is set in another port of the associated memory control unit MCU of the given system, second, the preceding and the following access request signals are compared by a priority control circuit 33', third, the associated priority control circuit 33' generates a wait signal W, fourth, the following access request signal is transmitted to the memory control unit MCU of the other system by the associated access selection circuit 31' of the given system, along with transmission of the wait signal by the operation of the associated first control circuit 40, and fifth, both signals as thus transmitted are set in an unused register RP of the other system at respective memory positions unrelated to the memory position where the preceding access request signal has already been set.

The same operation is executed when the preceding access request is the "store access" and the following access request is the "fetch access", and when the preceding access request and the following access request are both the "store access" requests. However, when the preceding access request and the following access request are both "fetch access" requests, the priority control circuit 33' doesn't generate the wait signal W; instead, the following access request signal is transmitted to the other memory control unit MCU by associated access selection circuit 31' without transmission of the wait signal by the operation of the associated first control circuit 40. At this time, the following access request signal is also set in an unused register RP of the other system unrelated to the position at which the preceding access request signal was already set in the register.

In the other multi-processor system, the preceding access request signal (an access request signal without the wait signal) as thus set in the associated register is transmitted to the access selection circuit 32 thereof prior to the following access request signal (an access request signal with the wait signal) by the operation of the associated second control circuit 50. When the preceding access request signal has thus been transmitted from the register and the end of an access by that access request signal is confirmed, the previously-set wait signal of the following access request signal is erased by the operation of the wait signal reset circuit 37.

Thus, in accordance with the structure and method of the present invention, it is possible to improve data throughput of the system by using the registers of the other system effectively, and by enabling an effective and high speed access control for mutual data transmission.

FIG. 4 is a detailed circuit diagram of one embodiment of the portions of the circuits shown in each of FIGS. 3A and 3B, which issues the wait signal W. In FIG. 4, 330 represents a priority circuit, 331 to 334 represent decoders, 335, 336, and 341 represent OR gates, 337 to 340 represent AND gates, and 342 represents a flip-flop. The access request signal including an operation code from the central processing unit CPU0 is set in the ports P0P0 or P0P1, and the access request signal from the central processing unit CPU1 is set in the ports P1P0 or P1P1. Each of the access request signals (shown by P0P0RQ, P0P1RQ, P1P0RQ, and P1P1RQ in FIG. 4) in the ports is branched and transmitted to the priority circuit 330, and a select signal (shown by P0P0SEL, P0P1SEL, P1P0SEL, or P1P1SEL in FIG. 4) is generated according to the respectively priorities of the access request signals. When a preceding access request signal is transmitted to and set in the port P0P0 (the port P0P1 is empty), the select signal P0P0SEL is generated in the priority circuit 330. After the port P0P0 is selected and the select signal P0P0SEL is generated, a bit S is set to "1" by the select signal P0P0SEL. Accordingly, the bit S indicates a selection possibility, or status, and the port with "1" level in the bit S cannot be selected. Note that, if the access request signal is for inner access, the bit S of the port is set to "1" by force when the access request signal is set in the port, thereby transmission of the signal from this port to the other system does not occur. The operation code in each access request signal as set in a given port is transmitted to the corresponding decoder 331 to 334, which detects from the operation code of each request signal whether or not priority control is necessary for the respective request signal. If the access request signal is for "store access", it is detected that priority control is necessary, but if the access request signal is for "fetch access", it is detected that priority control is not necessary—in both cases, according to the operation code.

If the access request signal which needs priority control exists in one of the ports connected to a given central processing unit, this access request signal is selected by the select signal and a wait signal W is generated at this time as follows. When a preceding access request signal P0P0RQ in the port P0P0 is for "store access", and a following access request signal P0P1RQ in the port P0P1 is for "fetch access", the decoder 331 outputs the priority signal P0P0D (high level "1") by detecting the operation code which indicates "store access" from the port P0P0, but the decoder 332 doesn't output the priority signal P0P1D because the operation code from the port P0P1 indicates "fetch access". The priority signal P0P0D is transmitted to the AND gates 337 and 338 through the OR gate 335. On the other hand, the access request signals P0P0RQ and P0P1RQ are both transmitted to the priority circuit 330, then the access request signal P0P1RQ is selected and the select signal P0P1SEL (high level "1") is generated. The select signal P0P1SEL is transmitted to the port P0P1 and the AND gate 338. In this way, an output signal is generated at the AND gate 338, and this output signal becomes a wait signal W of high level "1" through the OR gate 341 and the flip-flop 342.

In FIG. 5 there is illustrated a detailed circuit diagram of one embodiment of the wait signal reset circuit 37 and second control circuit 50 shown in FIGS. 3A and 3B, together with the registers RP0 to RP3 and the access selection circuit 32 in each memory control unit. The wait signal reset circuit 37 includes six comparators 371 to 376 for detecting whether or not sources of two access request signals are the same central processing unit, each by comparing two respective requester ID signal RQTRID, six AND gates 377 to 382, four NOR gates, and four inverters (only one inverter 387 is shown in FIG. 5), and the second control circuit 50 is composed of four AND gates 500 to 503. In each register RP, V represents a valid signal storing area, RQTRID represents a storing area for requester ID signal which identifies a signal source, W represents a wait signal storing area, and ETC. represents another storing area. The requester ID signal is set in the RQTRID of the register RP when the contents of a port is transmitted to the register, because each port has an ID signal generating means (not shown in FIG. 4) and the requester ID signal is transmitted to the register RP in the other system together with the other information. In FIG. 5, +RPi−RQTRID (i is 0, 1, 2, or 3) represents the requester ID signal from the register RPi, which indicates the source of the access request signal, for example, the source is the central processing unit CPU0, +RPi−V represents the valid signal from the register RPi, and −RPi−V represents the inverted valid signal from the register RPi. Six comparators 371 to 376 are provided to compare every combination of the requester ID signal from four registers RP0 to RP3, and each comparator 371–376 outputs a corresponding high level signal "1" when the respective, two input requester ID's applied thereto identify the same source. Six AND gates 377 to 382 are provided to obtain a logical product of every of the aforesaid combinations of the requester ID signals and the respective valid signals from the four registers RP0 to RP3. The respective output signals of the AND gates 377 to 382 are transmitted through the corresponding NOR gates 383–386 to the corresponding reset terminals of the wait signal storing areas of the registers RP0–RP3, respectively corresponding to the input signals.

The operation of the second control circuit 50 is explained below under the condition that the preceding access request signal is set in the register RP0, and the following access request signal is set in the register RP1 with the wait signal W. The AND gate 500 transmits a high level signal "1" to the access selection circuit 32 since the valid signal is high and the wait signal is low at register RP0, while the AND gate 501 transmits a low level signal "0" to the access selection circuit 32 since the valid signal is high level and the wait signal is high level at register RP1. In this way, the access selection circuit 32 can access one of the main memories according to the access request signal from the register RP0, prior to responding to the access request signal from the register RP1.

The reset operation of the wait signal reset circuit 37 is next explained below under the condition that the preceding access request signal from the central processing unit CPU1 is set in the register RP0, the following access request signal from the central processing unit CPU1 is set in the register RP1 with the wait signal W, and the access request signal from the central processing unit CPU0 is not set in other registers.

(1) Before the access by the preceding access request signal stored in the register RP0 is operated, the logic level of each valid signal is as follows.

| RP0−V :"1" | RP1−V :"1" | RP2−V :"0" | RP3−V :"0" |
|---|---|---|---|
| −RP0−V :"0" | −RP1−V :"0" | −RP2−V :"1" | −RP3−V :"1". |

And RP0−RQTRID and RP1−RQTRID indicate that the source of the access request signal is the central processing unit CPU1. In this condition, only the comparator 371 outputs the high level signal "1", and only the AND gate 377 outputs the high level signal "1". Accordingly, every NOR gate outputs a low level signal "0", so that none of the wait signals is reset.

(2) When the access by the preceding access request signal stored in the register RP0 is finished, the valid signal in the port P0P0 is reset, and then the signal RP0−V is changed from high "1" to low "0" and the signal −RP0−V is changed from low "0" to high "1". Then the output of the AND gate 378 changes from low "0" to high "1". This change causes the output level of the NOR gate 384 to change from low "0" to high "1", thereby resetting the wait signal W in the register RP1. In this way, the wait signal of the following access request signals is reset by the wait signal reset circuit 37.

I claim:

1. A data processing system, having a plurality of multi-processor systems with respective main memories and a plurality of interface lines interconnecting said plurality of multi-processor systems, for processing inner and outer access request signals and for selective transmission of data therebetween, each of said multi-processor systems processing both inner access request signals requesting access to the respective main memory thereof and also outer access request signals requesting access to the respective main memory of a different multi-processor system, of the plurality thereof, of the data processing system and comprising:

at least one access request generating means for selectively generating inner and outer access request signals, each inner access request signal designating the respective said multi-processor system and the function of access to said respective main memory means thereof and each outer access request signal designating a specific, different said multi-processor system of said plurality thereof and the function of access to said respective main memory of said different multi-processor system and each said access request signal furthermore selectively specifying one of data fetch and data store operations to be performed, selectively and correspondingly, at the respective main memory of the multi-processor system designated thereby; and a memory control unit connected to said respective main memory means and said respective access request generating means and to said interface lines, said interface lines thus being connected to said respective memory control units of said plurality of multi-processor systems of said data processing system, each said memory control unit further comprising:

signal storing means for receiving and storing access request signals generated by said at least one access request generating means and including, for each said access generating means, corresponding first and second storing means, wherein first and second successive access request signals generated by an individual said access request generating means are stored, respectively, by said corresponding first and second storing means as a set of preceding and following access control signals, said signal storing means storing said access request signals until confirmation that the memory access function and operation requested thereby is completed, priority control means for detecting the necessity of performing priority control with respect to each said stored set of preceding and following access request signals generated by said individual access request generating means, in accordance with both said stored signals of said set designating access to the same said multi-processor system and in accordance with the data fetch and data store operations selectively and respectively specified by said stored signals of said set, and for generating a priority control signal for each said stored set of preceding and following access request signals upon detecting the necessity of priority control therefore, first access selection means, responsive to each stored set of preceding and following outer access request signals which commonly designate a specific, different said multi-processor system, for transmitting corresponding preceding and following access request signals to said thereby designated, different multi-processor system, first control means, responsive to the generation of a priority control signal by said priority control means for a respective, said stored set of preceding and following outer access request signals, for controlling said first access selection means to transmit said priority control signal in accompanying relationship with the transmission of said corresponding following access request signal of said set to said memory control unit of said thereby designated, different multi-processor system, plural register means, operable when said respective multi-processor system is designated by a set of preceding and following, outer access request signals generated by the respective access request generating means of a different said multi-processor system, for receiving and separately storing in respective said register means of said plurality thereof, said corresponding, preceding and following access request signals and any said accompanying priority control signal as generated and transmitted thereto by the respective first access selection means of said different multi-processor system, second access selection means for selectively responding to each of said inner access request signals as transmitted thereto for providing the thereby requested access to said respective main memory of said respective multi-processor system and for performing the thereby specified memory operation, and second control means for selectively transmitting access request signals, as separately stored in said plural register means, to said second access selection means of said respective multi-processor system, said second control means being responsive to each said set of corresponding preceding and following access request signals having an accompanying priority control signal, stored in said register means, for inhibiting transmission of said following access request signal to said second access selection circuit while said preceding access request signal of said stored set remains stored in said respective said register means and for enabling transmission of said following access request signal of said stored set to said second access selection circuit upon completion of the memory access function and operation designated and specified by said preceding access request signal of said set.

2. A data processing system as set forth in claim 1, wherein said second control means includes erase means for erasing said priority control signal, accompanying and stored with said following access request signal in said respective said register means, from said respective said register means upon completion of performance of the memory access function and operation designated and specified by said preceding access request signal of said set.

3. A data processing system as set forth in claim 1, wherein said second control means stores said access request signal, as received thereby from a different said multi-processing system, at random in an empty one of said plural register means.

4. A data processing system as set forth in claim 1, wherein said priority control means determines the necessity of priority control and accordingly generates said priority control signal, for a given said set of said preceding and following access request signals, when the successive, preceding and following access request signals selectively and respectively specify one of: (1) data store and data fetch operations, (2) data fetch and data store operations, and (3) data store and data store operations.

5. A data processing system as set forth in claim 1, wherein said priority control means determines the necessity of priority control and accordingly generates said priority control signal, for a given said set of preceding and following access request signals, when at least one of the successive, preceding and following access request signals specifies a data store operation.

* * * * *

UNITED STATES PATENT AND TRADEMARK OFFICE
CERTIFICATE OF CORRECTION

PATENT NO. : 5,218,688
DATED : Jun. 8, 1993
INVENTOR(S) : NISHIDA

It is certified that error appears in the above-indentified patent and that said Letters Patent is hereby corrected as shown below:

Col. 6, line 28, after "CPU" insert --of the given system--;
line 35, change "a" to --the associated--.

Col. 7, line 30, change "spectively" to --spective--.

Col. 9, line 34, change "signals" to --signal--.

Signed and Sealed this

Twenty-sixth Day of March, 1996

Attest:

BRUCE LEHMAN

*Attesting Officer*   *Commissioner of Patents and Trademarks*